March 26, 1940.    G. T. WATT    2,195,105
HEEL TURNER DRIVE
Filed April 19, 1938    3 Sheets-Sheet 1

Inventor
George T. Watt
By Wright, Brown,
Quinby May
Attorneys

March 26, 1940. G. T. WATT 2,195,105
HEEL TURNER DRIVE
Filed April 19, 1938 3 Sheets-Sheet 2

Inventor
George T. Watt
By Wright, Brown,
Quinby & May
Attorneys

March 26, 1940. G. T. WATT 2,195,105
HEEL TURNER DRIVE
Filed April 19, 1938 3 Sheets-Sheet 3

Inventor
George T. Watt
By Wright, Brown,
Quinby & May
Attorneys

Patented Mar. 26, 1940

2,195,105

UNITED STATES PATENT OFFICE 2,195,105

HEEL TURNER DRIVE

George T. Watt, Haverhill, Mass., assignor to Pope Machinery Corporation, Haverhill, Mass., a corporation of Massachusetts Application April 19, 1938, Serial No. 202,915

8 Claims. (Cl. 12—87)

This invention relates to a power-transmission system for driving a pair of spindles by means of a single motor and certain novel combinations of belts. It relates more specifically to a drive for spaced spindles having parallel axes of rotation, the drive being such that their rotation is in opposite directions. For purposes of illustration, the invention herein shall be illustrated and described as embodied in a machine for turning wood heels. This machine is the type shown in United States Letters Patent No. 2,039,695, granted to me on May 5, 1936.

In these heel turning machines it is required that the two vertical spindles be power driven in opposite directions, that is, in directions such that the blades of the cutter heads turn in towards each other as the operator faces them. Most of the heel turners now in use are belt driven by means of a horizontal motor-driven countershaft positioned on the floor several feet in back of and independent of the turning machine. This spaced positioning is necessary for satisfactory belt action and life. Two quarter-turn belts, usually of fabric, having one of the belts turned one way and the other one the opposite way, result in the required directions of rotation for the two spindles. This system of power transmission is bulky and difficult to install, requires care and skill in securing proper alignment with the turner, and requires considerable floor space.

It is an object of this invention to provide a new and more efficient power and power-transmission assembly than has heretofore been available for this class of machines. This assembly is built in as a part of the machine itself so that it requires no time or attention at the time of plant installation. Thus permanent alinement is built into the machine and no extra floor space over that occupied by the turner itself is required.

It is a further object of the invention to provide new combinations of certain types of commercial belts and adjustments therefor which will yield better results with less maintenance attention than has heretofore been possible.

In the attainment of these objects, I utilize a single vertical motor mounted within the regular turning machine frame on an adjustably fixed sub-frame which also carries an idler belt pulley. This idler pulley is rotatable about a vertical spindle which is eccentrically mounted for horizontal adjustment relative to the motor spindle. Said sub-frame is adjustable in a horizontal direction to vary the distance between the turning machine spindles and the motor and idler shafts. Short pulley center distances are satisfactory because straight belts are used instead of quarter-turn or cross belts as in the prior art.

A preferred embodiment of the invention includes the use of so-called V and double-V belts, running in multiple on suitably grooved pulleys. Short pulley center distances are advantageous for this type of belt. The right-hand spindle, as seen by the operator, performs, in the heel turner illustrated, the major portion of the heel-turning operation. This spindle is driven with straight multiple V belts in conventional manner, the vertical motor being wired to rotate in a clockwise direction as viewed from above, which produces the required direction of rotation for the right-hand turner spindle. It is obvious that the left-hand spindle cannot be driven from the same motor by straight belt drive because the direction of spindle rotation would be wrong. Cross belts would give the correct direction of rotation, but cross belts are impractical at the high speeds used in this class of machines, especially with the short pulley center distances necessary to secure the desired compactness. To solve this difficulty, I have utilized the so-called double-V belts which are adapted for pulley engagement on two opposite sides or faces of the belts which for convenience may be called the inside and outside, it being the insides of these belts which engage the driven spindle pulley. By means of an idler pulley, the outsides of these belts are brought into driving engagement with the motor pulley in a manner such that the left-hand spindle of the heel turner is driven in the required direction of rotation.

These arrangements and devices, including means of adjustment and other features, are more fully set forth and disclosed in the following description and drawings in which Figure 1 is an isometric view of a heel-turning machine partly cut away to show the V and double-V belt drive.

Figure 2:
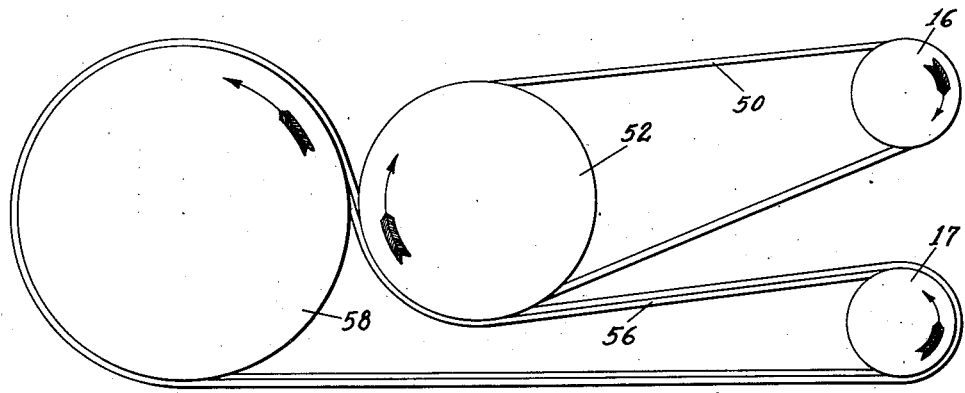
Figure 2 is a diagrammatic plan view of the belt arrangement.
Figure 5:
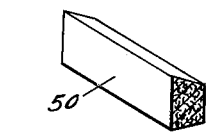
Figure 5 shows the shape of the V belt.
Figure 4:
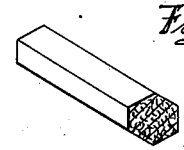
Figure 4 shows the shape of the double-V belt.
Figure 1:
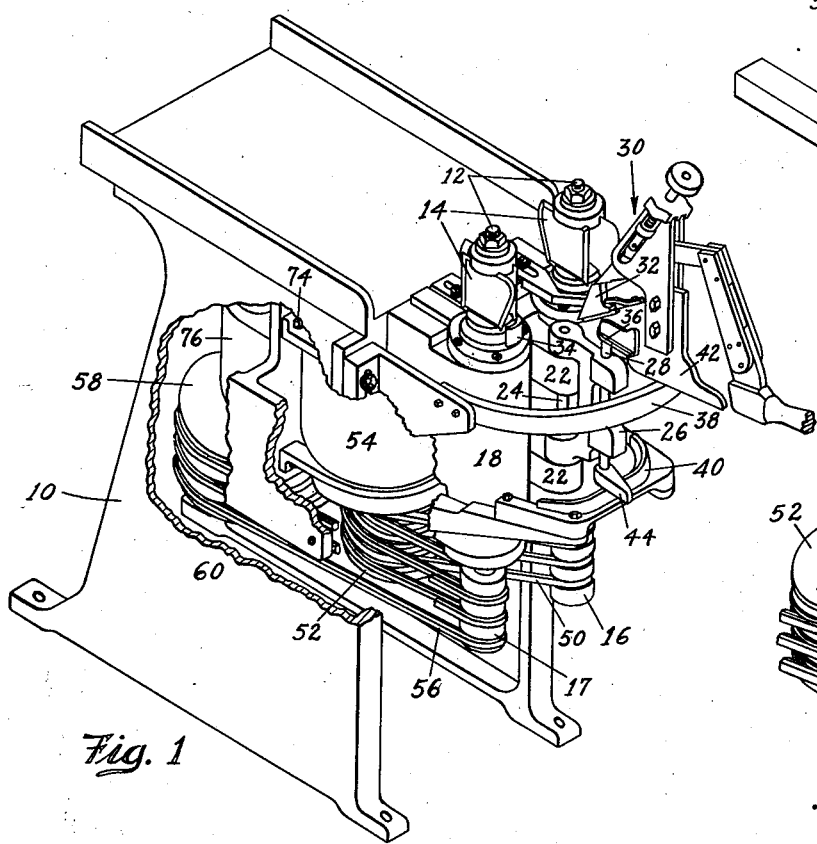
Figure 3:
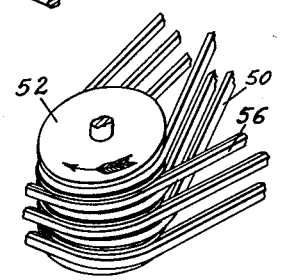
Figure 3 is a fragmentary isometric view of the motor pulley and the two series of belts in engagement therewith.

The wood heel turning machine illustrated in the drawings comprises a frame 10 having two cutter spindles 12 and having form cutters 14 and belt pulleys 16 and 17 mounted on the ends thereof, and spindles being carried on suitable upper and lower anti-friction type bearings (not shown) in the housings 18. Also carried by the frame between the spindles are bosses 22 supporting the vertical shaft 24 carrying a crane 26 in which is mounted a vertical jack shaft 28 on which is pivotally mounted a work-holding jack 30. The construction and operation of the jack are well known and need not, therefore, be specifically described herein, it being sufficient to say that the jack is adapted to support a heel blank 32 which can be engaged by either of the cutters by swinging the jack about the axis of the crane shaft 24. This movement of the jack toward the cutters is limited by adjustable collars on stops 34 engaged by a cam plate 36 carried by the jack.

The movements of the jack in the cutting operation are controlled by the cam plate 36 and by upper and lower tracks 38 and 40 supported on and extending about the frame. Briefly, the upper track controls the tilting of the heel blanks through the agency of a rider 42 on the track 38, and the lower track controls the elevation of the heel blank through the agency of a rider 44 engaging the lower track 40, all of which is well understood in machines of this type.

The pulley 16 of the right-hand spindle is driven by a multiple V belt 50 which is looped around the pulley 16 and a pulley 52 mounted on the shaft of a motor 54, both of these pulleys being engaged by the inside faces of the belt. The pulley 17 of the left-hand spindle is driven, as indicated in Figure 2, by a suitable double-V belt 56 which is looped around the pulley 17 and an idler pulley 58 mounted behind the motor pulley 52 in such a manner that the belt 56 engages the motor pulley outside of its loop and the outside faces of the multiple belt 56 are held against a substantial arc of the pulley 52, sufficient for satisfactory driving engagement. All of these pulleys are suitably grooved in the usual manner to receive V belts. Each of the belts is thus arranged to form a single closed loop, and none of the belts is crossed. In other words, the belts are so arranged that a line taken at any point across the outer face of a belt at right angles to the lengthwise dimension at that point will be parallel to the axes of the driving and driven spindles. This is not true of crossed belts.

Figure 6:
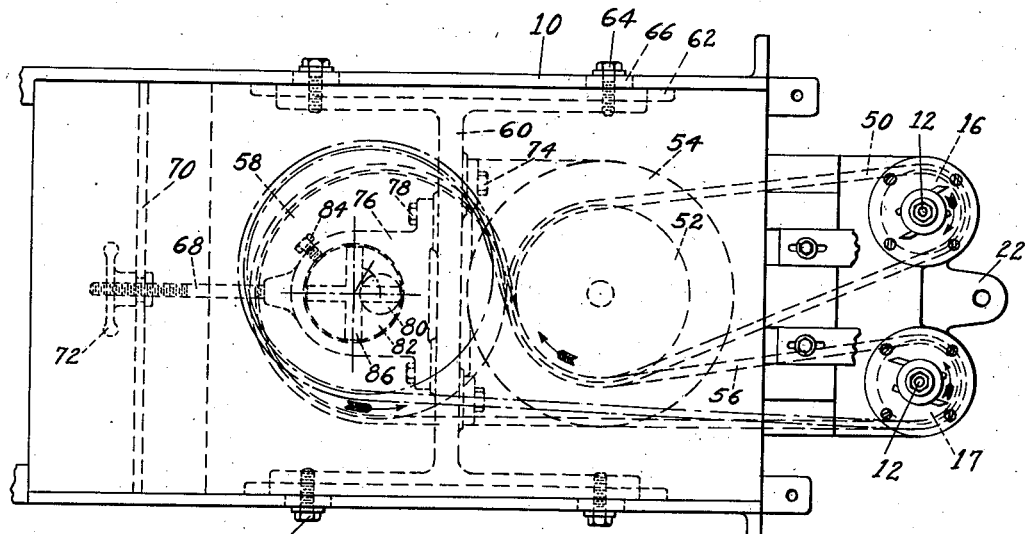
Figure 6 is a partial plan view of the machine.
Figure 8:
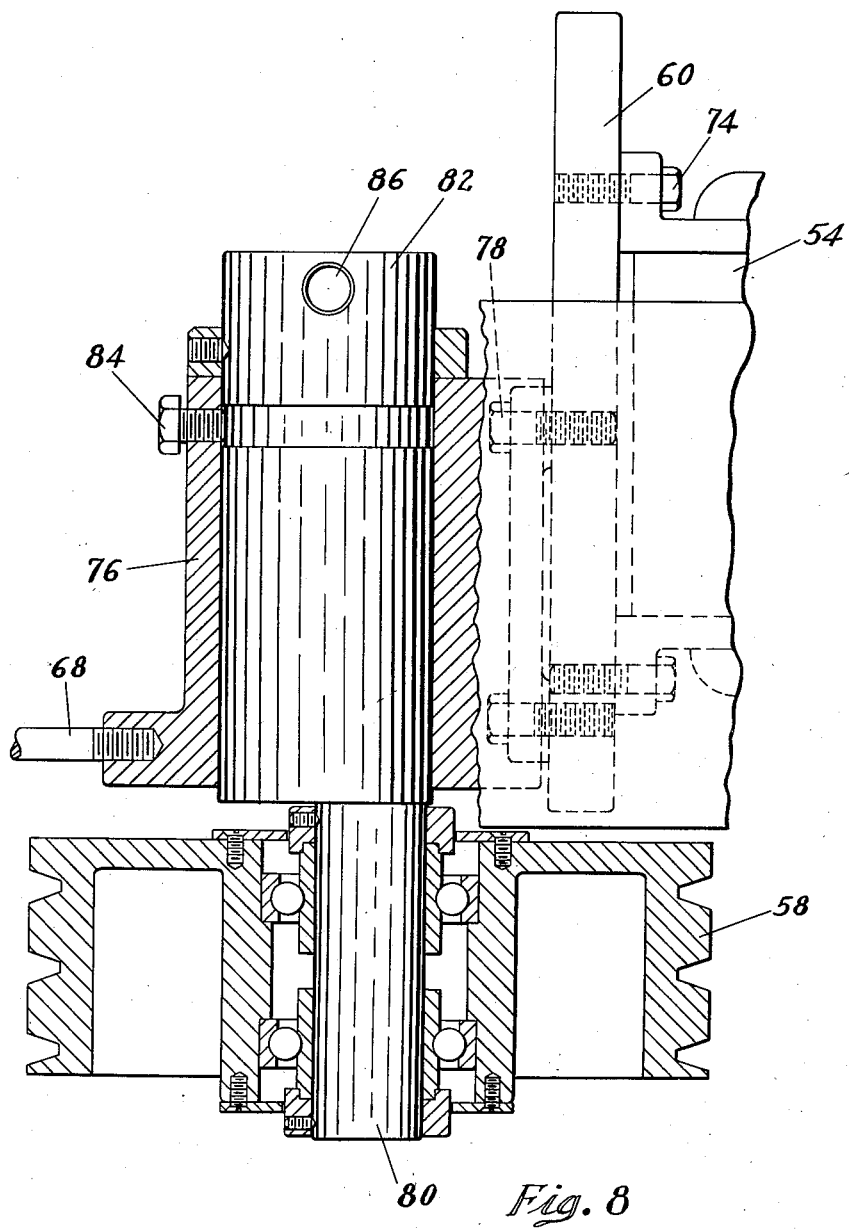
Figure 8 is a fragmentary elevation of a sub-frame within the machine, a portion being broken away to show in section.

For the support of the motor 54 and the idler pulley 58, a heavy member or sub-frame 60, shaped like an I-beam, is mounted within the main frame 10. This sub-frame is supported on horizontal trackways 62 and is secured in adjusted position by locking bolts 64 which pass through horizontal slots 66 in the side members of the main frame 10. This permits adjustment of the motor pulley and the idler pulley together toward or away from the cutter spindles. The motor is secured to the sub-frame 60 as by bolts 74. A bracket 76 for the idler pulley is secured by bolts 78 to the other side of the member 60. A threaded shaft 68 extends from the bracket 76 through a transverse member 70 of the main frame. A hand wheel 72 is in threaded engagement with the shaft 68 and is held against axial movement by engagement with the member 70 as indicated in Figure 6. When the locking bolts 64 for the member 60 are loose, the member 60 can be adjustively moved by rotation of the hand wheel 72. This results in simultaneous regulation of the tension of both sets of belts.

To provide for separate regulation of one set of belts, the idler pulley 58 is mounted for independent adjustment relative to the sub-frame 60. To this end the idler pulley shaft 80 is carried eccentrically by a cylindrical member 82 which is rotatively adjustable in the bracket 76. A locking screw 84 secures the member 82 in any adjusted position. To facilitate angular adjustment of the member 82, holes 86 are provided therethrough to receive a rod or bar by which the member may be turned. It is evident from Figure 6 that rotative adjustment of the member 82 will shift the axis of the idler pulley 58 and will thus regulate the tension of the belts 56 independently of the belts 50.

Figure 7:
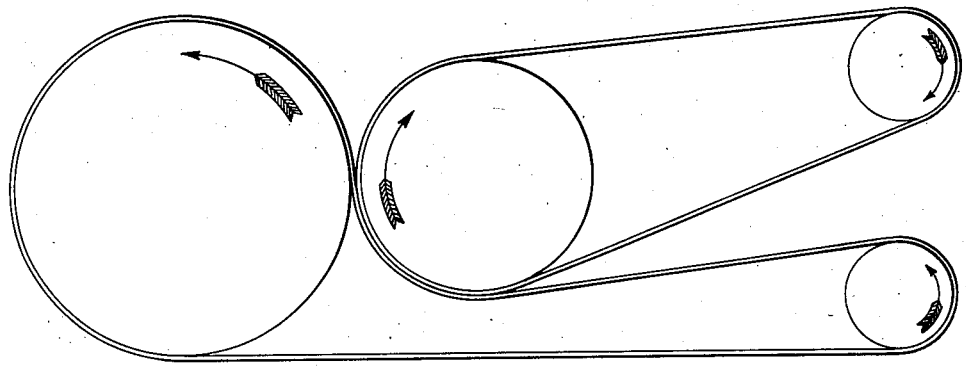
Figure 7 is a diagrammatic plan view of the pulleys with flat canvas belts thereon.

In place of the V belts and the double-V belts, equally good results may be had from the use of ordinary flat endles belts as illustrated in Figure 7. For this purpose, I preferably use fabric belts of three or four inch width and in medium weight similar, except for length, to those used on the quarter-turn drive from the horizontal countershaft hereinbefore described.

Certain embodiments of the invention having thus been described, what is claimed as new and desired to be secured by Letters Patent is:

1. In a wood-heel shaping machine, a frame, a pair of cutter spindles thereon, and means for rotating said spindles at high speeds in opposite directions, said means comprising a motor mounted within said machine, and belt connections between each of said spindles and said motor so arranged that a line taken at any point across the outer face of any belt at right angles to the lengthwise dimension of the belt at that point will be parallel to the axes of the driving and driven spindles.

2. In a wood-heel shaping machine, a frame, a pair of cutter spindles thereon, and means for rotating said spindles at high speeds in opposite directions, said means comprising a motor mounted within said machine, belt pulleys carried by said spindles and said motor, a pair of belts having their inner faces engaging respective spindle pulleys, the inner face of one of said belts also engaging the motor pulley, and means for maintaining the outer face of the other belt in engagement with said motor pulley.

3. In a wood-heel shaping machine, a frame, a pair of cutter spindles thereon, and means for rotating said spindles at high speeds in opposite directions, said means comprising a motor mounted within said machine, belt pulleys carried by said spindles and said motor, a pair of belts having their inner faces engaging respective spindle pulleys, the inner face of one of said belts also engaging the motor pulley, and an idler pulley mounted within the machine and engaged by the inner face of the other said belt, said idler pulley being located in such a manner as to maintain the outer face of said other belt in engagement with a substantial arc of said motor pulley.

4. In a wood-heel shaping machine including a frame and a pair of vertical cutter spindles mounted at the front end of said frame, a horizontally adjustable sub-frame mounted within said frame, driving means mounted on said sub-frame and consisting of a single motor and an idler pulley, and belt connections between said spindles and said motor and idler pulley arranged to cause said spindles to rotate in opposite directions when said motor rotates.

5. In a wood-heel shaping machine including a frame and a pair of vertical cutter spindles mounted at the front end of said frame, a horizontally adjustable sub-frame secured within said frame, a motor mounted on said sub-frame, belt pulleys carried by said spindles and motor, an idler pulley mounted on said sub-frame, a belt looped around one of said spindle pulleys and said motor pulley, and a second belt looped around the other said spindle pulley and said idler pulley, said pulleys being arranged so that said motor pulley engages said second belt outside of its loop.

6. In a wood-heel shaping machine including a frame and a pair of vertical cutter spindles mounted at the front end of said frame, a horizontally adjustable sub-frame secured within said frame, a driving member mounted on said sub-frame, belt connections between each of said spindles and said driving member, means cooperating with said driving member and belt to cause said spindles to rotate in opposite directions, means for adjustably shifting said sub-frame to vary the tension on both said belts simultaneously, and means for independently varying the tension on one of said belts only.

7. In a wood-heel shaping machine including a frame and a pair of vertical cutter spindles mounted at the front end of said frame, a horizontally adjustable sub-frame secured within said frame, a motor mounted on said sub-frame, belt pulleys carried by said spindles and motor, an idler pulley mounted on said sub-frame, a belt looped around one of said spindle pulleys and said motor pulley, a second belt looped around the other said spindle pulley and said idler pulley, said pulleys being arranged so that said motor pulley engages said second belt outside of its loop, means for adjustably shifting said sub-frame to vary the tension of both belts simultaneously, and means for shifting said idler pulley to vary the tension of said second belt only.

8. In a wood-heel shaping machine having a frame and a pair of vertical cutter spindles thereon, pulleys on said spindles, an idler pulley mounted within said machine, a double-V belt looped around said idler pulley and one of said spindle pulleys, a vertical motor mounted within the machine and having a pulley outside of the loop of said belt but having driving engagement with a portion thereof, and a V belt looped around the motor pulley and the other spindle pulley.

GEORGE T. WATT.